(12) United States Patent
Tomita

(10) Patent No.: US 7,644,939 B2
(45) Date of Patent: Jan. 12, 2010

(54) HANDLEBAR STOPPER STRUCTURE OF VEHICLE

(75) Inventor: Hiroaki Tomita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 122 days.

(21) Appl. No.: 11/892,906

(22) Filed: Aug. 28, 2007

(65) Prior Publication Data

US 2008/0053743 A1 Mar. 6, 2008

(30) Foreign Application Priority Data

Aug. 31, 2006 (JP) .............................. 2006-236526

(51) Int. Cl.
*B62D 5/04* (2006.01)
(52) U.S. Cl. ......................................... 280/89; 180/444
(58) Field of Classification Search .................. 180/78, 180/436, 443, 444; 280/89, 272
See application file for complete search history.

(56) References Cited

U.S. PATENT DOCUMENTS 4,712,633 A * 12/1987 Suzuki et al. ............... 180/429

| | | | | |
|---|---|---|---|---|
| 4,773,514 A | * | 9/1988 | Gustafsson | 188/306 |
| 5,076,383 A | * | 12/1991 | Inoue et al. | 180/417 |
| 2004/0099470 A1 | * | 5/2004 | Tanigaki et al. | 180/443 |
| 2006/0175124 A1 | * | 8/2006 | Saito et al. | 180/444 |

FOREIGN PATENT DOCUMENTS

JP  H3-1877 U  1/1991

* cited by examiner

*Primary Examiner*—Lesley D Morris
*Assistant Examiner*—Levon Fiore
(74) *Attorney, Agent, or Firm*—Birch, Stewart, Kolasch & Birch, LLP

(57) ABSTRACT

To reduce space occupied by a handlebar stopper structure of a vehicle and to lower the cost of the handlebar stopper structure. A steering shaft is attached to an input shaft provided at an upper portion of an electric power steering unit with an output shaft provided at a lower portion of the electric power steering unit being coupled to the wheel-side. An upper handlebar stopper for regulating a turning angle of the steering shaft is provided between the steering shaft and a housing that is provided at an upper portion of the electric power steering unit. The upper handlebar stopper is configured by an orthogonally-projecting member projecting in the orthogonal direction relative to and from the steering shaft and axially-projecting parts projecting in the axial direction of the steering shaft from the housing in order to regulate the turning of the orthogonally-projecting member.

18 Claims, 5 Drawing Sheets

HANDLEBAR STOPPER STRUCTURE OF VEHICLE

CROSS-REFERENCE TO RELATED APPLICATIONS

The present application claims priority under 35 USC 119 to Japanese Patent Application No. 2006-236526 filed on Aug. 31, 2006 the entire contents of which are hereby incorporated by reference.

BACKGROUND OF THE INVENTION

1. Field of the Invention

The present invention relates to an improvement in a handlebar stopper structure of a vehicle.

2. Description of Background Art

A handlebar stopper structure for a vehicle is known wherein a structure is provided wherein a handlebar stopper is mounted between an output shaft coupled to an operation handlebar and a chassis. See, for example, JP-U No. H3-1877.

FIGS. 5 and 8 of JP-U No. H3-1877 illustrate an electric power steering apparatus that includes an input shaft 5 coupled to an operation handlebar 3, and an output shaft 11 coupled to the input shaft 5 through a steering torque sensor 7 and a speed-reducing device 9. The output shaft 11 is coupled to wheels (not shown) through a tie rod 13.

A locking member 35 projects from the output shaft 11 and a pair of stopper members 39 and 39 which are attached to a chassis 37 for configuring a stopper mechanism 33 for regulating a maximum steering angle of the wheels.

The stopper members 39 and 39 project from the chassis 37 in a radial direction, and the locking member 35 which abuts on the stopper members 39 and 39 accordingly extends in the radial direction. Thus, a space occupied by the stopper mechanism 33 in the vehicle body becomes larger, which has an effect on the arrangement of the other components.

The electric power steering apparatus is supported by a bracket 43 which extends from the chassis, and a dimensional error of the bracket 43 has an effect on the positional accuracy of the locking member 35 of the stopper mechanism 33 through the output shaft 11. Thus, it is difficult to manage the accuracy of a distance between the locking member 35 and the stopper members 39 and 39. More specifically, an error with respect to the distance is likely to become larger.

Further, the locking member 35 is provided on the output shaft 11 and the stopper members 39 and 39 are provided on the chassis 37. Between the locking member 35 and the stopper members 39 and 39, there are interposed a plurality of components, such as a bearing for rotatably supporting a lower end of the output shaft 11, a bracket for supporting the bearing, a lower chassis, and the chassis 37. Accordingly, if, for example, dimensional errors of these components themselves and assembling errors are accumulated, an error with respect to a distance between the locking member 35 and the stopper members 39 and 39 becomes larger. Thus, it is difficult to regulate the wheels so as to have a predetermined maximum steering angle. If the working and assembling accuracy of each component is enhanced, it is possible to regulate the wheels so as to have a predetermined maximum steering angle, but the cost incurred is increased.

SUMMARY AND OBJECTS OF THE INVENTION

An object of an embodiment of the present invention is to reduce a space occupied by a handlebar stopper structure of a vehicle and to lower the cost of the handlebar stopper structure.

The invention according to an embodiment of the present invention is to provide a handlebar stopper structure for a vehicle in which an electric power steering unit is attached to a body frame with a handlebar attached to an input shaft being provided at an upper portion of the electric power steering unit through a steering shaft. An output shaft is provided at a lower portion of the electric power steering unit and is coupled to the wheels-side. A handlebar stopper is provided for regulating a turning angle of the steering shaft to a predetermined angle. The handlebar stopper is provided between the steering shaft and a housing which is provided at an upper portion of the electric power steering unit and which supports a lower portion of the steering shaft, wherein the handlebar stopper is configured by an orthogonally-projecting part projecting in the orthogonal direction relative to and from the steering shaft and axially-projecting parts projecting in the axial direction of the steering shaft from the housing in order to regulate the turning of the orthogonally-projecting part.

Since the axially-projecting parts extend along the steering shaft, if the axially-projecting parts are provided closer to the steering shaft, a large space is not occupied.

An amount by which the orthogonally-projecting part projects may be small so that the orthogonally-projecting part abuts on the axially-projecting parts. Thus, if the orthogonally-projecting part is turned along with steering, a large space is not occupied.

Further, since a lower portion of the steering shaft is supported by the housing, only a portion of the housing which supports the steering shaft is interposed between the orthogonally-projecting part and the axially-projecting parts. Accordingly, accumulative dimensional errors can be decreased, as compared to a case where the number of components to be interposed therebetween is large.

The invention according to an embodiment of the present invention provides a handlebar stopper structure of a vehicle, wherein the axially-projecting parts are provided in the vicinity of a bearing which is provided in the housing in order to rotatably support the steering shaft.

As the effects, since where the bearing is provided has at least a rigidity enough to support the steering shaft, a force exerted when the orthogonally-projecting part abuts on the axially-projecting parts can be accepted by the rigidity.

In the invention according to an embodiment of the present invention, the handlebar stopper is configured by an orthogonally-projecting part projecting in the orthogonal direction relative to and from the steering shaft and axially-projecting parts projecting in the axial direction of the steering shaft from the housing in order to regulate the turning of the orthogonally-projecting part. Accordingly, by allowing the axially-projecting parts to project in the axial direction of the steering shaft from the housing, the orthogonally-projecting part projecting in the orthogonal direction relative to and from the steering shaft can be made shorter, and a space occupied by the handlebar stopper can be made smaller. Thus, the vicinity of the electric power steering unit can be downsized.

Further, since only a portion of the housing which supports the steering shaft is interposed between the orthogonally-projecting part and the axially-projecting parts, the number of components interposed between the orthogonally-projecting part and the axially-projecting parts can be reduced so as to decrease accumulative dimensional errors. Further, the accuracy of a distance between the orthogonally-projecting part and the axially-projecting parts can be enhanced. Thus, the accuracy of turning regulation of the handlebar stopper can be enhanced.

In the invention according to an embodiment of the present invention, the axially-projecting parts are provided in the vicinity of a bearing which is provided in the housing in order to rotatably support the steering shaft. The bearing is provided with at least a rigidity enough to support the steering shaft. Thus, a rigidity enough to accept a force exerted when the orthogonally-projecting part abuts on the axially-projecting parts can be secured.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The best mode for carrying out the invention will be described below on the basis of the accompanying drawings. It should be noted that the drawings are viewed on the basis of the directions of arrows.

Figure 1:
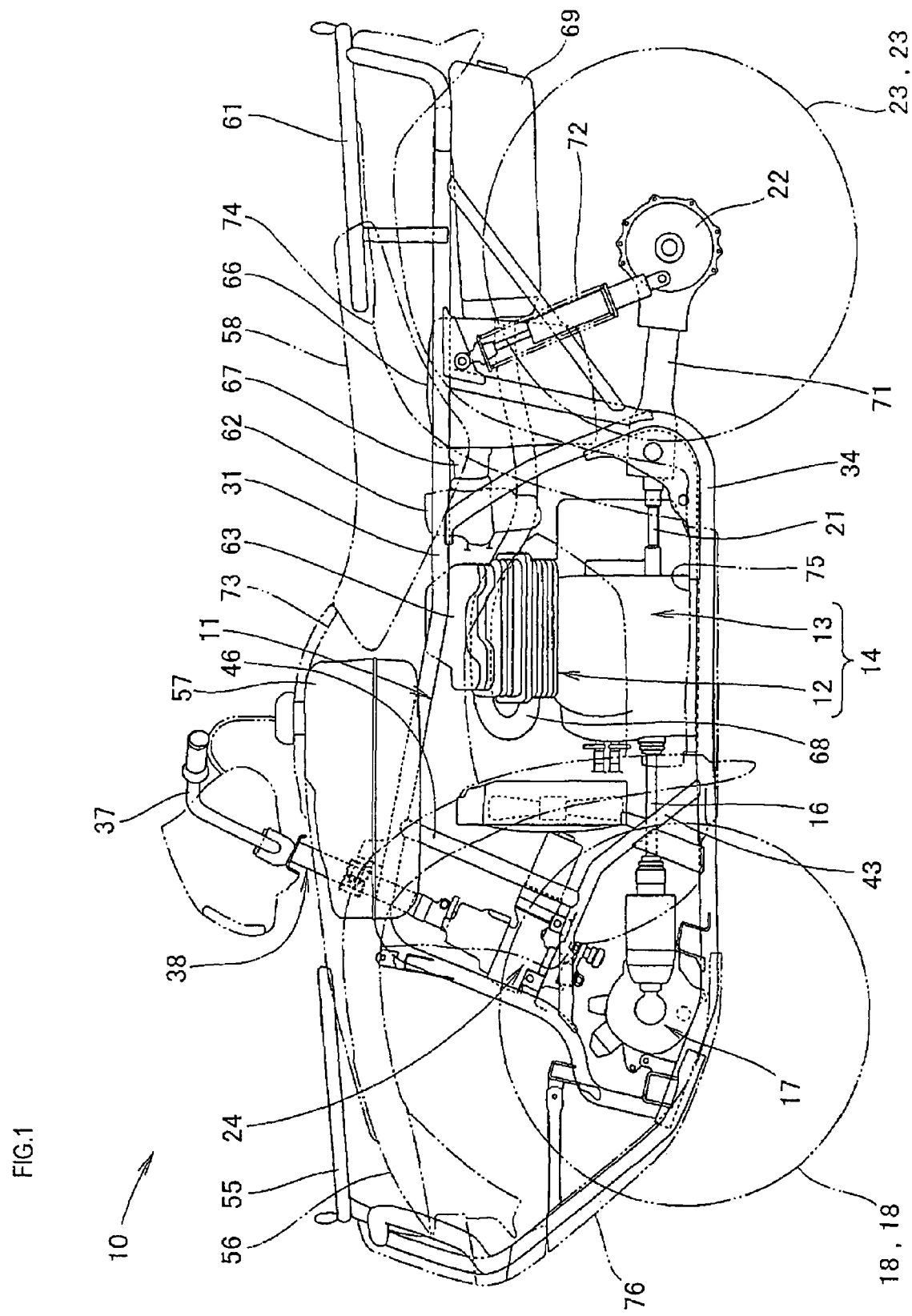
FIG. 1 is a side view of a vehicle in which a handlebar stopper structure according to the present invention is employed.

FIG. 1 is a side view of a vehicle in which a handlebar stopper structure according to the present invention is employed. An ATV (All Terrain Vehicle) 10 as a vehicle is a four-wheel-drive vehicle in which: a power unit 14 including an engine 12 and a transmission 13 is mounted at a middle portion of a body frame 11. A front final reduction gear unit 17 is coupled to a front portion of the transmission 13 through a front propeller shaft 16 with left and right front wheels 18 and 18 coupled to the front final reduction gear unit 17 through a drive shaft (not shown). A rear final reduction gear unit 22 is coupled to a rear portion of the transmission 13 through a rear propeller shaft 21 with left and right rear wheels 23 and 23 coupled to the rear final reduction gear unit 22 through another drive shaft (not shown). An electric power steering unit 24 is provided for reducing a steering effort by which the front wheels 18, 18 are steered.

The body frame 11 includes a pair of left and right upper main frames 31 and 32 (only the reference numeral 31 on the near side is shown), each of which extends in the front-rear direction and each front portion of which is bent downwardly. A pair of lower main frames 34 and 36 (only the reference numeral 34 on the near side is shown) are coupled to lower ends and intermediate portions of the upper main frames 31 and 32, respectively. A pair of left and right inclined frames 43 and 44 (only the reference numeral 43 on the near side is shown) are provided which intersect with and are coupled to the upper main frames 31 and 32 and the lower main frames 34 and 36, respectively, and which support a lower portion of the electric power steering unit 24. A pair of left and right inclined sub-frames 46 and 47 (only the reference numeral 46 on the near side is shown) intersect with and are coupled to the upper main frames 31 and 32 and the inclined frames 43 and 44, respectively.

The upper main frames 31 and 32 are members for rotatably supporting an upper portion of a steering shaft 38. A handlebar 37 is attached to an upper end of the main frames.

A front carrier 55 is provided together with a front fender 56 for covering the upper side and the rear side of the front wheel 18. A fuel tank 57 is provided together with a seat 58 and a rear carrier 61. A carburetor 62 is coupled to the rear side of a cylinder head 63 of the engine 12 with an air cleaner 66 that is coupled to the carburetor 62 through a connecting tube 67. An exhaust pipe 68 extends from a front portion of the cylinder head 63 to the rear of the vehicle with a muffler 69 which is connected to a rear end of the exhaust pipe 68. A swing arm 71 swingably supports the rear wheels 23 and 23 on the lower main frames 34 and 36 side. A pair of left and right rear shock absorber units 72 and 72 (only the reference numeral 72 on the near side is shown) intersect with and are attached to the swing arm 71 and the upper main frames 31 and 32-side, respectively. A body side cover 73 is arranged on the sides of the power unit 14 with a rear fender 74 for covering the upper side and the front side of the rear wheel 23. A step floor 75 is provided together with a skid plate 76 for covering front lower portions and front portions of the left and right lower main frames 34 and 36.

Figure 2:
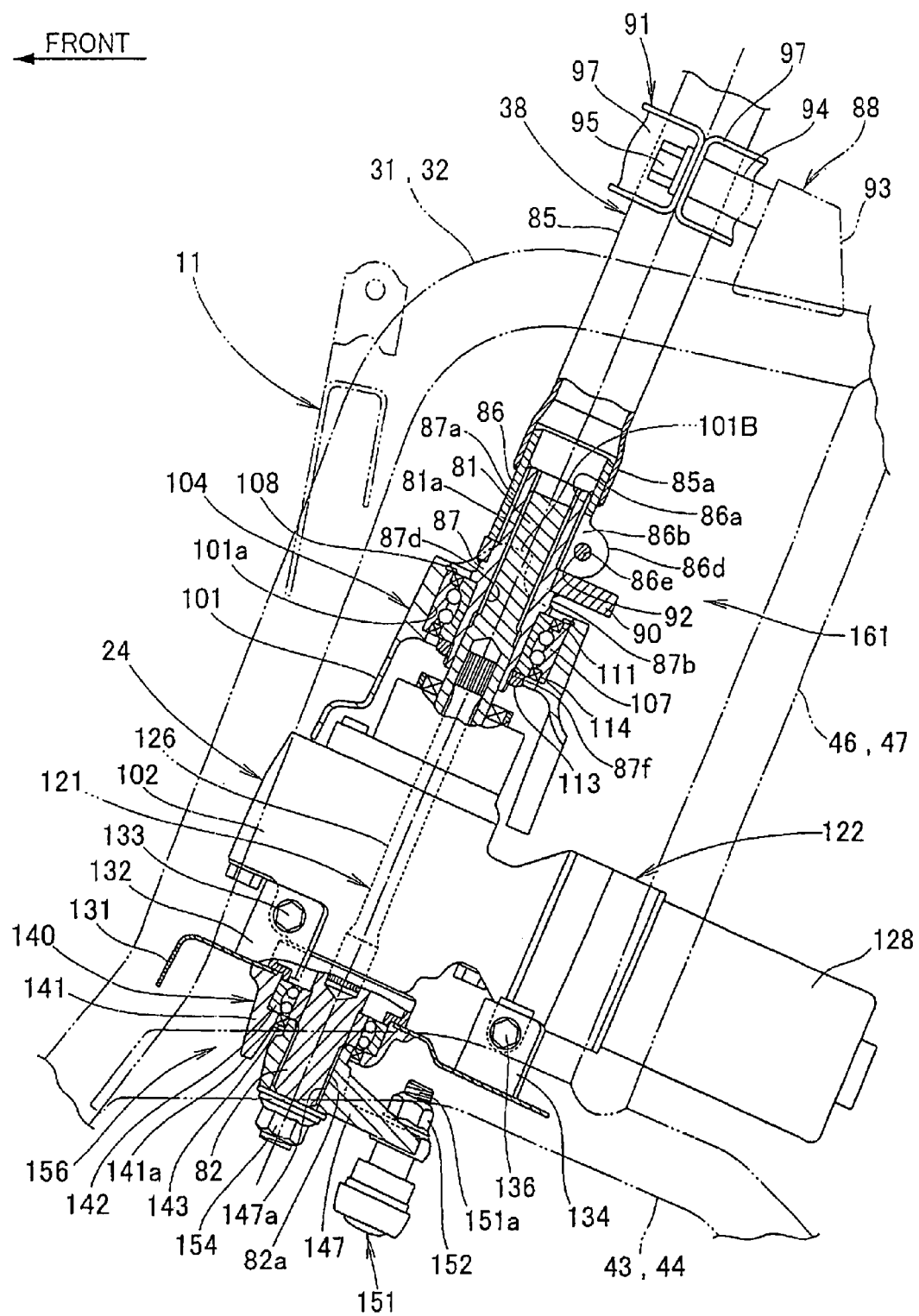
FIG. 2 is a side view of main components of the vehicle according to the present invention.

FIG. 2 is a side view of main components of the vehicle according to the present invention wherein an intermediate portion of the steering shaft 38 is rotatably supported above the body frame 11 with an input shaft 81 being provided at an upper portion of the electric power steering unit 24 and being coupled to a lower end of the steering shaft 38. A lower portion of the electric power steering unit 24 is attached to a lower portion of the body frame 11 with an output shaft 82 provided at a lower portion of the electric power steering unit 24 being rotatably supported by a lower portion of the body frame 11.

The steering shaft 38 includes an upper shaft 85 to an upper end of which the handlebar 37 (see FIG. 1) is attached, a middle shaft 86 whose upper end is connected to a lower end of the upper shaft 85 by welding, and a lower shaft 87 which is serration-coupled to the middle shaft 86 and whose lower end is serration-coupled to the input shaft 81.

The upper shaft 85 is a member which is rotatably attached, through an upper bearing part 91, to a steering support bracket 88 that intersects with and is attached to the left and right upper main frames 31 and 32. A large diameter part 85a is fitted into an upper end of the middle shaft 86 and is formed at a lower end of the upper shaft 85.

The middle shaft 86 forms a female serration 86a which is coupled to a male serration 87a formed on the lower shaft 87, and forms a split groove 86b which is in communication with the female serration 86a-side and the outer circumference-side and which extends in the axial direction. Projecting parts 86c and 86d (only the reference numeral 86d on the far side is shown) are integrally molded with both edge portions of the split groove 86b (see FIG. 4). An internal thread (not shown) is formed in the projecting part 86c with a bolt insertion hole 86e being provided in the projecting part 86d. A bolt 92 is allowed to penetrate the bolt insertion hole 86e with a tip end of the bolt 92 being screwed into the internal thread of the projecting part 86c so that an upper end of the lower shaft 87 is tightened with the middle shaft 86.

The lower shaft 87 is a cylindrical member which configures a lower end of the steering shaft 38 and which is connected to the input shaft 81. The lower shaft 87 forms a large diameter part 87b at its intermediate portion, and forms on an inner circumferential face a female serration 87d to be coupled to a male serration 81a formed on the input shaft 81. An orthogonally-projecting member 90, projecting in the orthogonal direction relative to the steering shaft 38 and in the rear direction, is attached to the lower shaft 87 by fitting and welding, so that the lower shaft 87 is positioned at the large diameter part 87b in the axial direction.

The steering support bracket 88 includes a cross member 93 which intersects with the upper main frames 31 and 32, and left and right boss parts 94 and 94 (only the reference numeral 94 on the near side is shown) which are attached to the cross member 93. The upper bearing part 91 is fixed by screwing bolts 95 into the respective boss parts 94 and 94.

The upper bearing part 91 includes a bushing (not shown) which is slidably fitted into the upper shaft 85, and a pair of retention metal fittings 97 and 97 for retaining the bushing. The retention metal fittings 97 and 97 are tightened to the boss parts 94 and 94 with the bolts 95 and 95, respectively.

To the electric power steering unit 24, a housing 101 is attached to cover an upper portion thereof. The housing 101 is a member whose lower portion is attached to a gear case 102 of the electric power steering unit 24 with a plurality of bolts (not shown) for rotatably supporting the lower shaft 87 through an intermediate bearing part 104 thereabove.

The intermediate bearing part 104 includes a double-row upper bearing 107 which is fitted into a hole part 101a provided at an upper portion of the housing 101 and the lower shaft 87, a snap ring 108 with which one end of the upper bearing 107 is positioned, and a nut 113 which is screwed into an external thread 87f at a tip end of the lower shaft 87 so as to fix the lower shaft 87 to the upper bearing 107.

The upper bearing 107 is a seal bearing to both sides of which seals 111 and 114 are attached. Since both sides of the upper bearing 107 are sealed, there is no need to provide additional seals, thus reducing the number of components and downsizing the structure.

As described above, an upper end of the lower shaft 87 of the steering shaft 38 is coupled to the upper shaft 85 through the middle shaft 86. A lower end of the steering shaft 38, together with the input shaft 81 of the electric power steering unit 24, is supported by the housing 101 through the upper bearing 107.

The electric power steering unit 24 includes the aforementioned input shaft 81 and output shaft 82, a torque sensor part 121 for detecting a steering wheel torque, and a power assist part 122 which generates a power for assisting a steering effort. The power assist part 122 is controlled by a control apparatus (not shown) on the basis of the steering wheel torque and the like detected by the torque sensor part 121.

The torque sensor part 121 includes a torsion bar 126 which is coupled to the input shaft 81 and the output shaft 82.

When the input shaft 81 is allowed to turn by operating the handlebar 37 (see FIG. 1), a relative turning angle is generated between the input shaft 81 and the output shaft 82, and the torsion bar 126 is twisted. The torsion amount is converted into a torque, so that the steering wheel torque can be obtained.

The power assist part 122 is configured by a clutch (not shown) and a speed reducing device (which is not shown, and includes a worm gear and a worm wheel) which are interposed between an electric motor 128 and an output shaft of the electric motor 128 and between the electric motor 128 and the output shaft 82, respectively.

In the electric power steering unit 24, the front-side gear case 102 located ahead of the output shaft 82 is attached to a plate-shape lower bracket 131, which intersects with and is attached to the upper main frames 31 and 32, and the inclined frames 43 and 44, through a front supporting member 132 with a bolt 133, and the rear-side gear case 102 located behind the output shaft 82 is attached to a rear supporting member 134, which is provided on the inclined frames 43 and 44, with a bolt 136.

As described above, the electric power steering unit 24 is a member in which a lower portion of the gear case 102 is supported at two front and rear positions of the front supporting member 132 and the rear supporting member 134 so that the output shaft 82 is sandwiched therebetween.

The control apparatus controls the power assist part 122 on the basis of the steering wheel torque detected by the torque sensor part 121, a steering angle detected by a steering angle sensor (not shown), and the vehicle speed of the ATV 10 (see FIG. 1).

A lower bearing part 140 for rotatably supporting the output shaft 82 includes a shaft supporting member 141 which is attached to a middle portion of the lower bracket 131, a self-aligning lower bearing 142 which is attached to the shaft supporting member 141 to rotatably support the output shaft 82, and a seal member 143 for protecting the lower bearing 142 from dust and the like.

The shaft supporting member 141 forms a downwardly-projecting part 141a projecting downwardly substantially along the output shaft 82 on the front side of the vehicle.

A center arm 147 is provided. By forming a female spline 147a on the center arm 147, the female spline 147a is spline-fitted to a male spline 82a formed at a lower end of the output shaft 82.

A ball joint 151 is provided in which a bolt part 151a formed at an end of the ball joint 151 is attached to a rear portion of the center arm 147 with a nut 152.

A nut 154 is screw-coupled to an external thread provided at a tip end of the output shaft 82 so as to fix the center arm 147 to the output shaft 82.

The downwardly-projecting part 141a of the shaft supporting member 141 described above, and a pair of laterally-projecting parts (not shown) of the center arm 147 configure a lower handlebar stopper 156 (the detail thereof will be described using FIG. 6).

Figure 3:
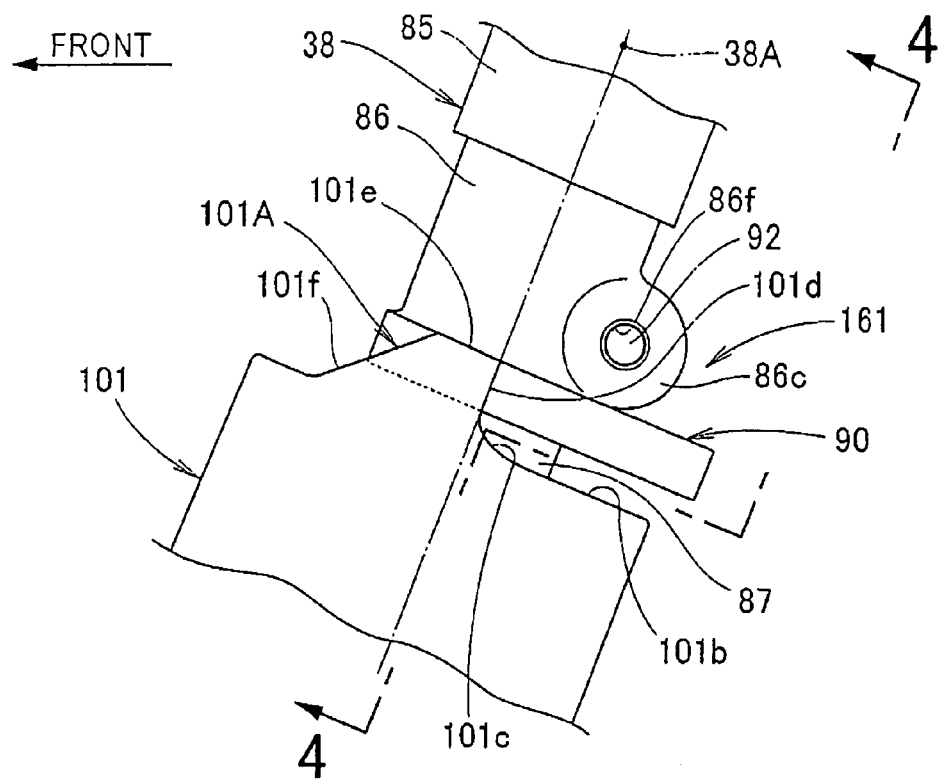
FIG. 3 is a side view of main components for explaining an upper handlebar stopper according to the present invention.

FIG. 3 is a side view of main components for explaining an upper handlebar stopper according to the present invention, and shows a structure in which the orthogonally-projecting member 90 is attached to the lower shaft 87 configuring a lower end of the steering shaft 38. A pair of left and right axially-projecting parts 101A and 101B (only the reference numeral 101A on the near side is shown), projecting in the axial direction of the steering shaft 38, are integrally molded with upper portions of the housing 101. The orthogonally-projecting member 90 and the axially-projecting parts 101A and 101B configure an upper handlebar stopper 161 which regulates a turning angle of the steering shaft 38 to a predetermined angle.

The axially-projecting part 101A includes a stopper face 110d is connected to an upper face 101b of the housing 101 through a circular-arc face 101c to extend along an axis line 38A of the steering shaft 38. An upper end face 101e extends substantially parallel to the upper face 101b from an upper edge of the stopper face 101d. An inclined face 101f is inclined downwardly from the upper end face 101e to the upper face 101b.

The stopper face 110d is a portion on which the orthogonally-projecting member 90 abuts.

Figure 4:
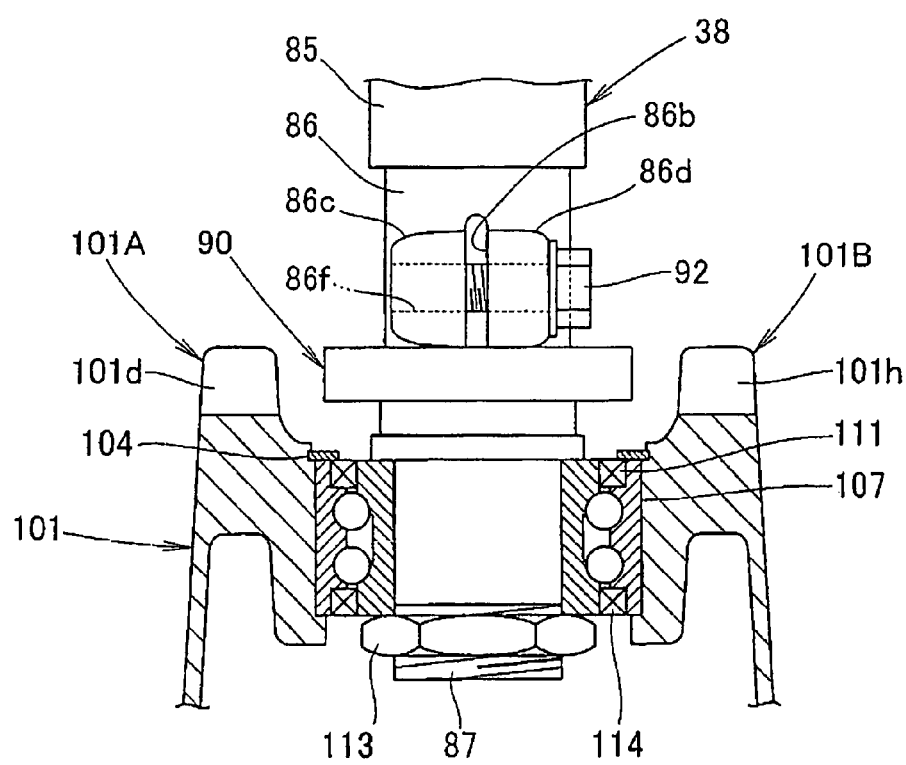
FIG. 4 is a cross sectional view taken along the line 4-4 of FIG. 3.

FIG. 4 is a cross-sectional view taken along the line 4-4 of FIG. 3, and illustrates a structure in which the axially-projecting parts 101A and 101B are provided at upper ends of the housing 101 with the lower shaft 87 being rotatably supported at an upper portion of the housing 101 through the upper bearing 107. The orthogonally-projecting member 90 is attached to the lower shaft 87 so as to be closer to the upper bearing 107. It should be noted that the reference numeral 86f is an internal thread formed in the projecting part 86c.

The axially-projecting part 101B has a bilaterally-symmetrical shape with respect to the axially-projecting part 101A, and is provided with a stopper face 101h. The names and reference numerals for the other components of the axially-projecting part 101B are identical to those of the axially-projecting part 101A.

An upper portion of the housing 101 supporting the upper bearing 107 is formed to have a large thickness, and has a rigidity necessary to support the lower shaft 87 of the steering shaft 38 and the input shaft 81 of the electric power steering unit (see FIG. 2). The rigidity of an upper portion of the housing 101 is greater than those of other portions of the housing 101.

Accordingly, by providing the axially-projecting parts 101A and 101B and the orthogonally-projecting member 90 in the vicinity of the upper bearing 107 of an upper portion of the housing 101 having such a rigidity, a load generated when the steering shaft 38 is turned and the orthogonally-projecting member 90 abuts on either of the axially-projecting parts 101A and 101B can be sustained by the great rigidity at an upper portion of the housing 101.

Since only the upper bearing 107 and the lower shaft 87 are interposed between the axially-projecting parts 101A and 101B, and the orthogonally-projecting member 90, the number of components interposed between the two kinds of components configuring the handlebar stopper is decreased as compared to a handlebar stopper in the past. Therefore, accumulative dimensional errors of the respective components (the upper bearing 107 and the lower shaft 87) become smaller, dimensional accuracy is enhanced between the axially-projecting parts 101A and 101B, and the orthogonally-projecting member 90, and the accuracy of a predetermined turning angle ($\theta 1$ to be described later) can be easily secured.

Figure 5:
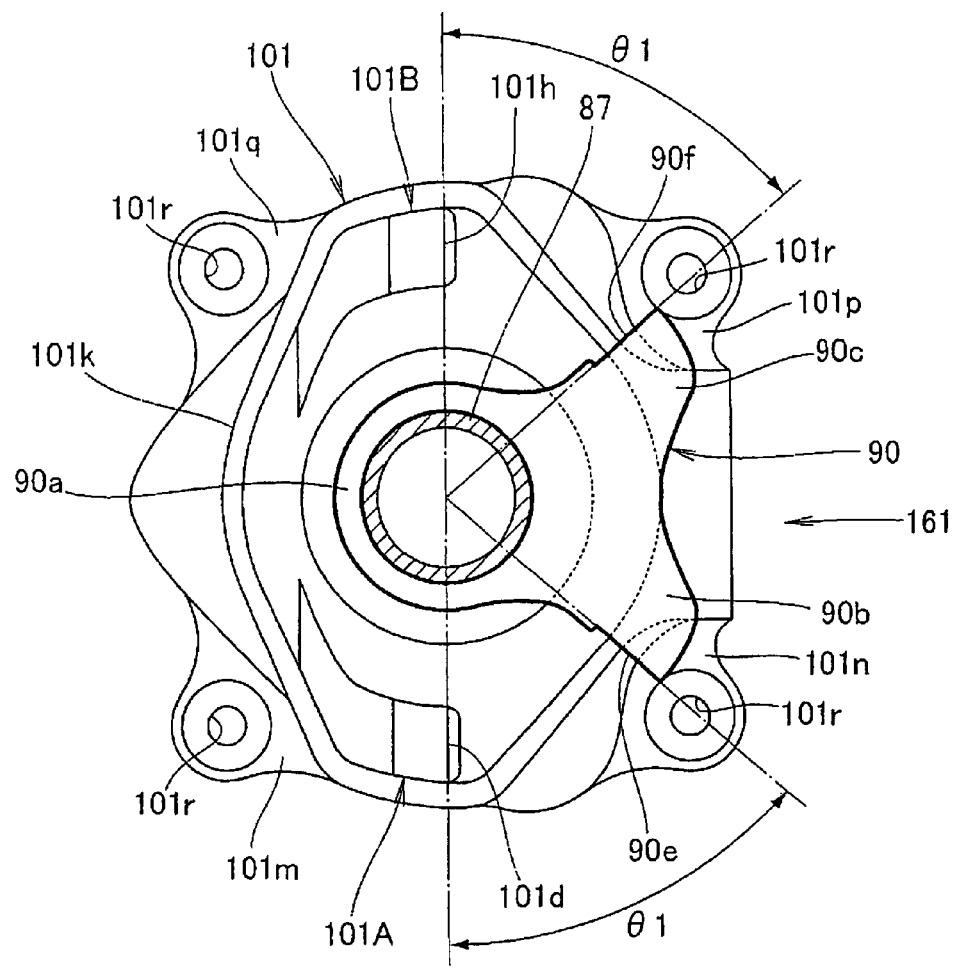
FIG. 5 is a plan view for explaining the upper handlebar stopper according to the present invention.

FIG. 5 is a plan view for explaining an upper handlebar stopper according to the present invention. The orthogonally-projecting member 90 (its outline is shown by the heavy line) includes a circular part 90a which is attached to the lower shaft 87, a left projecting part 90b, which extends diagonally rearwardly to the left from the circular part 90a, and a right projecting part 90c which is formed adjacent to the left projecting part 90b and which extends diagonally rearwardly to the right from the circular part 90a.

The left projecting part 90b is a part on which an abutting face 90e that abuts on the stopper face 101d of the housing 101 when being turned is formed. The right projecting part 90c is a part on which an abutting face 90f that abuts on the stopper face 101h of the housing 101 when being rotated is formed.

Each angle $\theta 1$ between the stopper face 101d and the abutting face 90e and between the stopper face 101h and the abutting face 90f is a turning angle by which the lower shaft 87 (namely, the steering shaft 38 (see FIG. 2)) is turned clockwise or counterclockwise from 0 degree of a handlebar steering angle.

The housing 101 includes a cylindrical part 101k at upper portions of which the axially-projecting parts 101A and 101B are formed, and flange parts 101m, 101n, 101p, and 101q which are formed at lower edges of the cylindrical parts 101k. Bolt insertion holes 10r, to which bolts for attaching the housing 101 to the gear case 102 of the electric power steering unit (see FIG. 2) are inserted, are provided in the respective flange parts 101m, 101n, 101p, and 101q.

Figure 6:
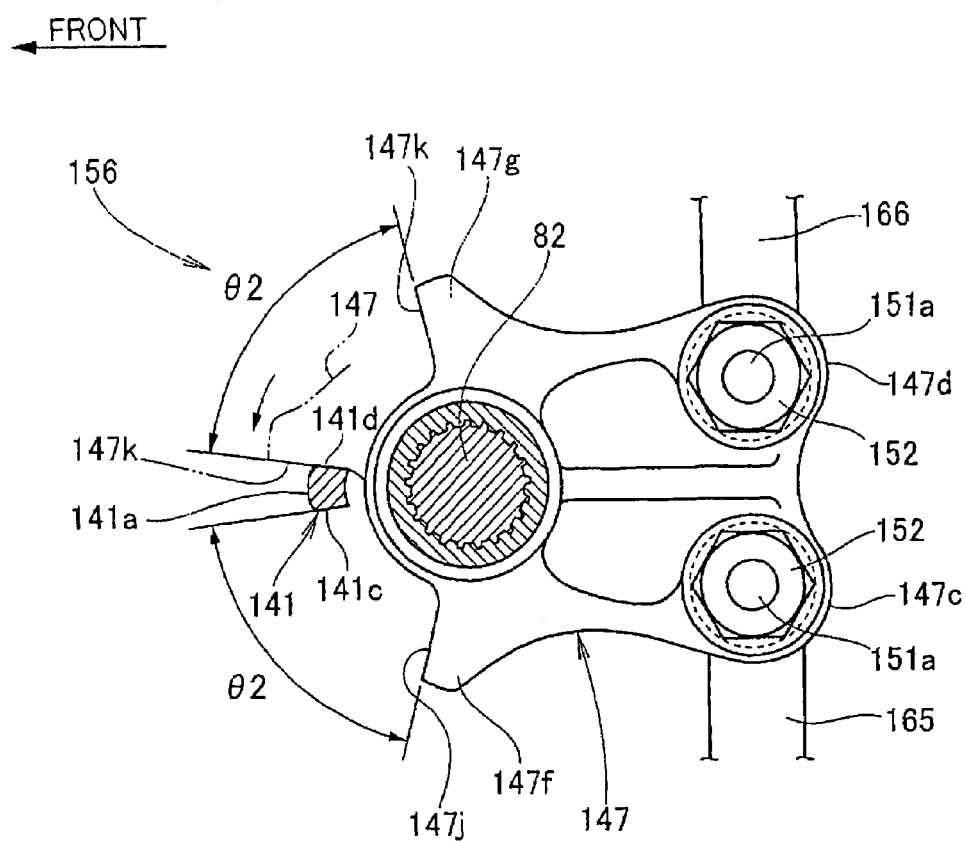
FIG. 6 is a plan view for explaining a lower handlebar stopper according to the present invention.

FIG. 6 is a plan view for explaining a lower handlebar stopper according to the present invention.

The shaft supporting member 141 is configured in such a manner that stopper faces 141c and 141d are formed at left and right portions of the downwardly-projecting part 141a.

The center arm 147 includes laterally-projecting parts 147f and 147g at its left and right portions. The laterally-projecting part 147f is a part on which an abutting face 147j that abuts on the stopper face 141c of the downwardly-projecting part 141a when being turned is formed. The laterally-projecting part 147g is a part on which an abutting face 147k that abuts on the stopper face 141d of the downwardly-projecting part 141a when being turned is formed.

Each angle $\theta 2$ between the stopper face 141c and the abutting face 147j and between the stopper face 141d and the abutting face 147k is a turning angle by which the output shaft 82 is turned clockwise or counterclockwise from 0 degree of a handlebar steering angle. The angle $\theta 2$ is larger than the turning angle $\theta 1$ of the lower shaft 87 shown in FIG. 5. More specifically, the upper handlebar stopper 161 (see FIG. 6) is operated prior to the lower handlebar stopper 156, that is, the turning angle for the upper handlebar stopper 161 is regulated prior to that for the lower handlebar stopper 156.

Tie rods 165, 166 are coupled to tie rod coupling parts 147c and 147d provided at rear portions of the center arm 147 which are coupled to the left and right front wheels 18 and 18 (see FIG. 1) so as to steer the front wheels 18 and 18 (see FIG. 1) along with the turning of the output shaft 82.

As shown in FIGS. 1, 2, and 5, a first embodiment of the present invention is directed to the vehicle 10 in which: the electric power steering unit 24 is attached to the body frame 11 with the handlebar 37 being attached to the input shaft 81 provided at an upper portion of the electric power steering unit 24 through the steering shaft 38. The output shaft 82 is provided at a lower portion of the electric power steering unit 24 and is coupled to the wheels 18 and 18 side. The upper handlebar stopper 161 for regulating the turning angle of the steering shaft 38 to the predetermined angle $\theta 1$ is provided between the steering shaft 38 and the housing 101 which is provided at an upper portion of the electric power steering unit 24 and which supports a lower portion of the steering shaft 38. The upper handlebar stopper 161 is configured by the orthogonally-projecting member 90 projecting in the orthogonal direction relative to and from the steering shaft 38 and the axially-projecting parts 101A and 101B projecting in the axial direction of the steering shaft 38 from the housing 101 in order to regulate the turning of the orthogonally-projecting member 90.

Accordingly, by allowing the axially-projecting parts 101A and 101B to project in the axial direction of the steering shaft 38 from the housing 101, the orthogonally-projecting member 90 projecting in the orthogonal direction relative to and from the steering shaft 38 can be made shorter, and a space occupied by the upper handlebar stopper 161 can be made smaller. Thus, the vicinity of the electric power steering unit 24 can be downsized.

Further, between the orthogonally-projecting member 90 of the steering shaft 38, and the axially-projecting parts 101A and 101B of the housing 101, only a portion of the housing 101 which supports the steering shaft 38, namely, only the upper bearing 107 is interposed. In more detail, in addition to the upper bearing 107, only the lower shaft 87 which is a part of the steering shaft 38 is interposed. Accordingly, the number of components interposed between the orthogonally-projecting part 90 and the axially-projecting parts 101A and 101B can be reduced so as to decrease accumulative dimensional errors, as compared to related art. Further, the accuracy of a distance between the orthogonally-projecting part 90 and the axially-projecting parts 101A and 101B can be enhanced. Thus, the accuracy of turning regulation of the upper handlebar stopper 161 can be enhanced.

As shown in FIG. 4, a second embodiment of the present invention provides the orthogonally-projecting part 90 that is formed in the vicinity of the upper bearing 107, as a bearing, which is provided in the housing 101 in order to rotatably support the steering shaft 38.

Thus, since where the upper bearing 107 is provided has at least a rigidity enough to support the steering shaft 38, it is possible that a rigidity enough to accept a force exerted when the orthogonally-projecting part 90 abuts on the axially-projecting parts 101A and 101B can be secured.

The handlebar stopper structure of the present invention is suitable for a four-wheeled vehicle such as an ATV.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A handlebar stopper structure for a vehicle in which an electric power steering unit is attached to a body frame comprising:
 a handlebar attached to an input shaft provided at an upper portion of the electric power steering unit through a steering shaft;
 an output shaft provided at a lower portion of the electric power steering unit, said output shaft being coupled to wheels for the vehicle; and
 a handlebar stopper for regulating a turning angle of the steering shaft to a predetermined angle, said handlebar stopper being provided between the steering shaft and a housing which is provided at an upper portion of the electric power steering unit and which supports a lower portion of the steering shaft;
 wherein the steering shaft includes an upper shaft and a lower shaft, and
 the handlebar stopper includes an orthogonally-projecting part projecting in an orthogonal direction from the lower shaft of the steering shaft, and an axially-projecting part projecting in an axial direction of the steering shaft from the housing in order to regulate the turning of the orthogonally-projecting part, and further comprising a bearing for supporting the steering shaft,
 wherein the orthogonally-projecting part projecting from the lower shaft is disposed above the bearing,
 wherein said housing includes an upper part wherein a left and right axially-projecting parts are formed,
 the upper part of the housing also including retaining apertures for accommodating fasteners for securing the housing to the electric power steering unit.

2. The handlebar stopper structure of a vehicle according to claim 1, wherein the axially-projecting part is provided in a vicinity of the bearing which is provided in the housing in order to rotatably support the steering shaft.

3. The handlebar stopper structure of a vehicle according to claim 1, wherein the axially-projecting part includes a first axially-projecting part disposed on one side of the steering shaft and a second axially-projecting part disposed on another side of the steering shaft.

4. The handlebar stopper structure of a vehicle according to claim 3, wherein the orthogonally-projecting part projects from a lower end of the steering shaft for selectively engaging either the first or second axially-projecting parts as the handlebar turns the steering shaft from one side to another side of the vehicle.

5. The handlebar stopper structure of a vehicle according to claim 3, wherein the first and second axially-projecting parts are integrally molded with an upper portion of the housing for regulating turning of the steering shaft to a predetermined angle.

6. The handlebar stopper structure of a vehicle according to claim 1, wherein the axially-projecting part includes a stopper face connected to an upper face of the housing through a circular-arc face extending along an axis line of the steering shaft.

7. The handlebar stopper structure of a vehicle according to claim 6, wherein an upper end face extends substantially parallel to the upper face from an upper edge of the stopper face and an inclined face is inclined downwardly from the upper end face to the upper face.

8. The handlebar stopper structure of a vehicle according to claim 1, wherein an upper portion of the housing is rigid for providing support for a lower portion of the steering shaft, and further including a bearing operatively mounted within said upper portion of the housing for rotatably mounting the steering shaft relative to the upper portion of the housing.

9. The handlebar stopper structure of a vehicle according to claim 1, wherein the orthogonally-projecting part includes a substantially circular portion, a left projecting part and a right projecting part, said left and right projecting parts being operatively mounted to move with the steering shaft for selective engagement with the axially-projecting part.

10. A handlebar stopper structure adapted for use with a vehicle comprising:
 a handlebar attached to an input shaft operatively connected to a steering shaft; and
 a handlebar stopper for regulating a turning angle of the steering shaft to a predetermined angle, said handlebar stopper being provided between the steering shaft and a housing;
 wherein the steering shaft includes an upper shaft and a lower shaft, and
 the handlebar stopper includes an orthogonally-projecting part projecting in an orthogonal direction relative to and from the lower shaft of the steering shaft, and an axially-projecting part projecting in an axial direction of the steering shaft from the housing in order to regulate the turning of the orthogonally-projecting part to a predetermined angle, and further including a bearing for supporting the steering shaft,
 wherein the orthogonally-projecting part projecting from the lower shaft is disposed above the bearing, wherein said housing includes an upper part wherein a left and right axially-projecting parts are formed, the upper part of the housing also including retaining apertures for accommodating fasteners for securing the housing to the electric power steering unit.

11. The handlebar stopper structure adapted for use with a vehicle according to claim 10, said bearing being operatively mounted relative to the housing for rotatably supporting the lower shaft of the steering shaft.

12. The handlebar stopper structure adapted for use with a vehicle according to claim 10, wherein the axially-projecting part includes a first axially-projecting part disposed on one side of the steering shaft and a second axially-projecting part disposed on another side of the steering shaft.

13. The handlebar stopper structure adapted for use with a vehicle according to claim 12, wherein the orthogonally-projecting part projects from a lower end of the steering shaft for selectively engaging either the first or second axially-projecting parts as the handlebar turns the steering shaft from one side to another side of the vehicle.

14. The handlebar stopper structure adapted for use with a vehicle according to claim 12, wherein the first and second axially-projecting parts are integrally molded with an upper portion of the housing for regulating turning of the steering shaft to a predetermined angle.

15. The handlebar stopper structure adapted for use with a vehicle according to claim 10, wherein the axially-projecting part includes a stopper face connected to an upper face of the housing through a circular-arc face extending along an axis line of the steering shaft.

16. The handlebar stopper structure adapted for use with a vehicle according to claim 15, wherein an upper end face extends substantially parallel to the upper face from an upper edge of the stopper face and an inclined face is inclined downwardly from the upper end face to the upper face.

17. The handlebar stopper structure adapted for use with a vehicle according to claim 10, wherein an upper portion of the housing is rigid for providing support for a lower portion of the steering shaft, and further including a bearing operatively mounted within said upper portion of the housing for rotatably mounting the steering shaft relative to the upper portion of the housing.

18. The handlebar stopper structure adapted for use with a vehicle according to claim 10, wherein the orthogonally-projecting part includes a substantially circular portion, a left projecting part and a right projecting part, said left and right projecting parts being operatively mounted to move with the steering shaft for selective engagement with the axially-projecting part.

* * * * *